(12) United States Patent
Chirakan et al.

(10) Patent No.: US 9,910,501 B2
(45) Date of Patent: Mar. 6, 2018

(54) SYSTEMS AND METHODS FOR IMPLEMENTING RETAIL PROCESSES BASED ON MACHINE-READABLE IMAGES AND USER GESTURES

(71) Applicant: Toshiba Global Commerce Solutions Holdings Corporation, Toyko (JP)

(72) Inventors: Jason Chirakan, Raleigh, NC (US); Douglas Hanthorn, Raleigh, NC (US); Dean F. Herring, Youngsville, NC (US)

(73) Assignee: TOSHIBA GLOBAL COMMERCE SOLUTIONS HOLDINGS CORPORATION, Tokyo (JP)

( * ) Notice: Subject to any disclaimer, the term of this patent is extended or adjusted under 35 U.S.C. 154(b) by 840 days.

(21) Appl. No.: 14/189,354

(22) Filed: Feb. 25, 2014

(65) Prior Publication Data
US 2015/0192999 A1  Jul. 9, 2015

Related U.S. Application Data

(60) Provisional application No. 61/924,334, filed on Jan. 7, 2014.

(51) Int. Cl.
*G06Q 30/00* (2012.01)
*G06F 3/01* (2006.01)
(Continued)

(52) U.S. Cl.
CPC ........... *G06F 3/017* (2013.01); *G02B 27/017* (2013.01); *G06F 3/0304* (2013.01);
(Continued)

(58) Field of Classification Search
CPC ............... G06Q 30/06; G06Q 30/0633; G06Q 30/0641; G06Q 30/0601; G06Q 30/02
(Continued)

(56) References Cited

U.S. PATENT DOCUMENTS

| 5,742,263 A | 4/1998 | Wang et al. |
| 6,236,736 B1 | 5/2001 | Crabtree et al. |

(Continued)

FOREIGN PATENT DOCUMENTS

| GB | 2494907 A1 | 3/2013 |
| JP | 2009093489 | 4/2009 |

OTHER PUBLICATIONS

Jans, Ivan. "Online Shopping in the Store with Google Glass." Imagine Life with Google Glass, Jun. 21, 2013. <http://imagine-life-with-google-glass.blogspot.com/2013/06/online-shopping-in-store-with-google.html>.

(Continued)

*Primary Examiner* — Andrew Joseph Rudy
(74) *Attorney, Agent, or Firm* — Olive Law Group, PLLC

(57) ABSTRACT

Systems and methods for implementing retail processes based on machine-readable images and user gestures are disclosed. According to an aspect, a method includes capturing one or more images including a machine-readable image and a user gesture. The method also includes identifying the machine-readable image as being associated with a product. Further, the method includes determining whether the user gesture interacts with the machine-readable image in accordance with a predetermined gesture. The method also includes implementing a predetermined retail process in association with the product in response to determining that the user gesture interacts with the machine-readable image in accordance with the predetermined gesture.

19 Claims, 3 Drawing Sheets

(51) Int. Cl.
*G06Q 10/08* (2012.01)
*G06Q 30/06* (2012.01)
*G06F 3/03* (2006.01)
*G06F 3/0482* (2013.01)
*G06F 3/0488* (2013.01)
*G02B 27/01* (2006.01)

(52) U.S. Cl.
CPC ........ *G06F 3/0482* (2013.01); *G06F 3/04883* (2013.01); *G06Q 10/087* (2013.01); *G06Q 30/0633* (2013.01); *G02B 2027/014* (2013.01)

(58) Field of Classification Search
USPC .............................................. 705/26.8, 26.81
See application file for complete search history.

(56) References Cited

U.S. PATENT DOCUMENTS

| | | | |
|---|---|---|---|
| 6,554,434 B2 | 4/2003 | Sciammarella et al. | |
| 8,027,096 B2 | 9/2011 | Feng et al. | |
| 8,072,393 B2 | 12/2011 | Riechel | |
| 8,371,505 B1 | 2/2013 | Zolotov et al. | |
| 8,467,991 B2* | 6/2013 | Khosravy | G01C 21/20 702/153 |
| 8,555,207 B2* | 10/2013 | Hildreth | G06F 3/017 715/856 |
| 8,606,645 B1* | 12/2013 | Applefeld | G06Q 30/02 705/14.25 |
| 9,020,845 B2 | 4/2015 | Marlowe et al. | |
| 9,092,774 B2* | 7/2015 | Becorest | G06Q 20/342 |
| 9,153,074 B2* | 10/2015 | Zhou | G06F 1/163 |
| 9,367,870 B2* | 6/2016 | Klein | G06Q 30/0643 |
| 9,412,121 B2* | 8/2016 | Tatzel | G06Q 30/0268 |
| 9,417,141 B2 | 8/2016 | Aberg et al. | |
| 9,449,343 B2* | 9/2016 | Mayerle | G06Q 30/0643 |
| 9,538,072 B2* | 1/2017 | Stewart | H04N 5/23219 |
| 9,569,001 B2* | 2/2017 | Mistry | G06F 1/163 |
| 9,607,437 B2* | 3/2017 | Reisner-Kollmann | G06T 19/006 |
| 9,639,186 B2* | 5/2017 | Thompson | G06F 3/038 |
| 9,734,376 B2 | 8/2017 | Nadabar et al. | |
| 9,773,402 B2 | 9/2017 | Raichman et al. | |
| 2006/0010447 A1 | 5/2006 | Bonch-Osmolovskiy et al. | |
| 2006/0104479 A1 | 5/2006 | Bonch-Osmolovskiy et al. | |
| 2006/0238550 A1 | 10/2006 | Page | |
| 2009/0021211 A1 | 8/2009 | Chiu et al. | |
| 2009/0212113 A1 | 8/2009 | Chiu et al. | |
| 2010/0158310 A1 | 6/2010 | McQueen et al. | |
| 2010/0199232 A1 | 8/2010 | Mistry et al. | |
| 2011/0001695 A1 | 1/2011 | Suzuki et al. | |
| 2011/0213664 A1 | 9/2011 | Osterhout et al. | |
| 2011/0221669 A1 | 9/2011 | Shams et al. | |
| 2011/0260967 A1 | 10/2011 | Matsushima | |
| 2012/0091204 A1 | 4/2012 | Shi | |
| 2012/0206485 A1 | 8/2012 | Osterhout et al. | |
| 2012/0224070 A1 | 9/2012 | Burroff et al. | |
| 2012/0235902 A1 | 9/2012 | Eisenhardt et al. | |
| 2012/0262558 A1 | 10/2012 | Boger et al. | |
| 2013/0083003 A1* | 4/2013 | Perez | G06F 3/005 345/419 |
| 2013/0019125 A1 | 7/2013 | Bradley et al. | |
| 2013/0191250 A1 | 7/2013 | Bradley et al. | |
| 2013/0218721 A1 | 8/2013 | Borhan et al. | |
| 2013/0265223 A1 | 10/2013 | Khosravy et al. | |
| 2013/0346168 A1 | 12/2013 | Zhou et al. | |

OTHER PUBLICATIONS

"Barcode Scanning with Google Glass: A Future or Fantasy? #ifihadglass." Barcode Scanning with Google Glass: A Future or Fantasy? #ifihadglass. Scandit, Sep. 3, 2013. <http://www.scandit.com/2013/04/09/barcode-scanning-with-google-glass-a-future-or-fantasy-ifihadglass/>.

Le Meur, Loic. "100 Google Glass Apps." 100 Google Glass Apps. LinkedIN, Sep. 3, 2013. <http://www.linkedin.com/today/post/article/20130502175201-32720-100-google-glass-apps>.

"AR Weekly Digest N.26." Augmented Reality News by AR23D Studio. AR23D Studio, Mar. 31, 2013. Web. <http://blog.ar23d.com/2013/03/>.

Notification of Transmittal of the International Search Report and the Written Opinion of the International Searching Authority, or the Declaration, PCT International Application No. PCT/US2014/072623, dated Mar. 11, 2015.

U.S. Non-Final Office Action for U.S. Appl. No. 14/555,749 dated Mar. 22, 2017.

U.S. Non-Final Office Action Response for U.S. Appl. No. 14/555,749 dated Jun. 9, 2017.

International Preliminary Report on Patentability and Written Opinion of the ISA dated Jul. 12, 2016, for Application No. PCT/US2014/072623.

U.S. Final Office Action for U.S. Appl. No. 14/555,749 dated Jul. 14, 2017.

Non-Final Office Action issued in counterpart U.S. Appl. No. 14/555,749 dated Dec. 14, 2017 (six (6) pages).

* cited by examiner

SYSTEMS AND METHODS FOR IMPLEMENTING RETAIL PROCESSES BASED ON MACHINE-READABLE IMAGES AND USER GESTURES

CROSS REFERENCE TO RELATED APPLICATION

This application claims the benefit of U.S. Provisional Patent Application No. 61/924,334, filed Jan. 7, 2014 and titled SYSTEMS AND METHODS FOR IMPLEMENTING RETAIL PROCESSES BASED ON MACHINE-READABLE IMAGES AND USER GESTURES, the content of which is hereby incorporated herein by reference in its entirety.

TECHNICAL FIELD

The present invention relates to retail devices and equipment, and more specifically, to implementation of retail processes based on machine-readable images and user gestures.

BACKGROUND

In retail environments, such as grocery stores and other "brick and mortar" stores, retail personnel and customers interact with products and other objects located in the retail environment. As an example, a customer may carry a computing device, such as a smartphone or wearable computing device, and use the computing device for purchasing the product either in the store or through an online retail system. The computing device may be operable to capture an image of a barcode of the product for identification of the product in a subsequent purchase transaction. In this way, the computing device may be used to facilitate purchase of the product while the user is located within a retail environment.

In another example, retail personnel may use a computing device for conducting store inventory. The computing device may be used to scan product barcodes. In this way, the products may be identified for the purposes of inventorying the store.

In view of the foregoing, it is desirable to provide improved techniques and devices for facilitating user interaction with products in a retail environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for implementing retail processes based on machine-readable images and user gestures. According to an aspect, a method includes capturing one or more images including a machine-readable image and a user gesture. The method also includes identifying the machine-readable image as being associated with a product. Further, the method includes determining whether the user gesture interacts with the machine-readable image in accordance with a predetermined gesture. The method also includes implementing a predetermined retail process in association with the product in response to determining that the user gesture interacts with the machine-readable image in accordance with the predetermined gesture.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

Figure 1:
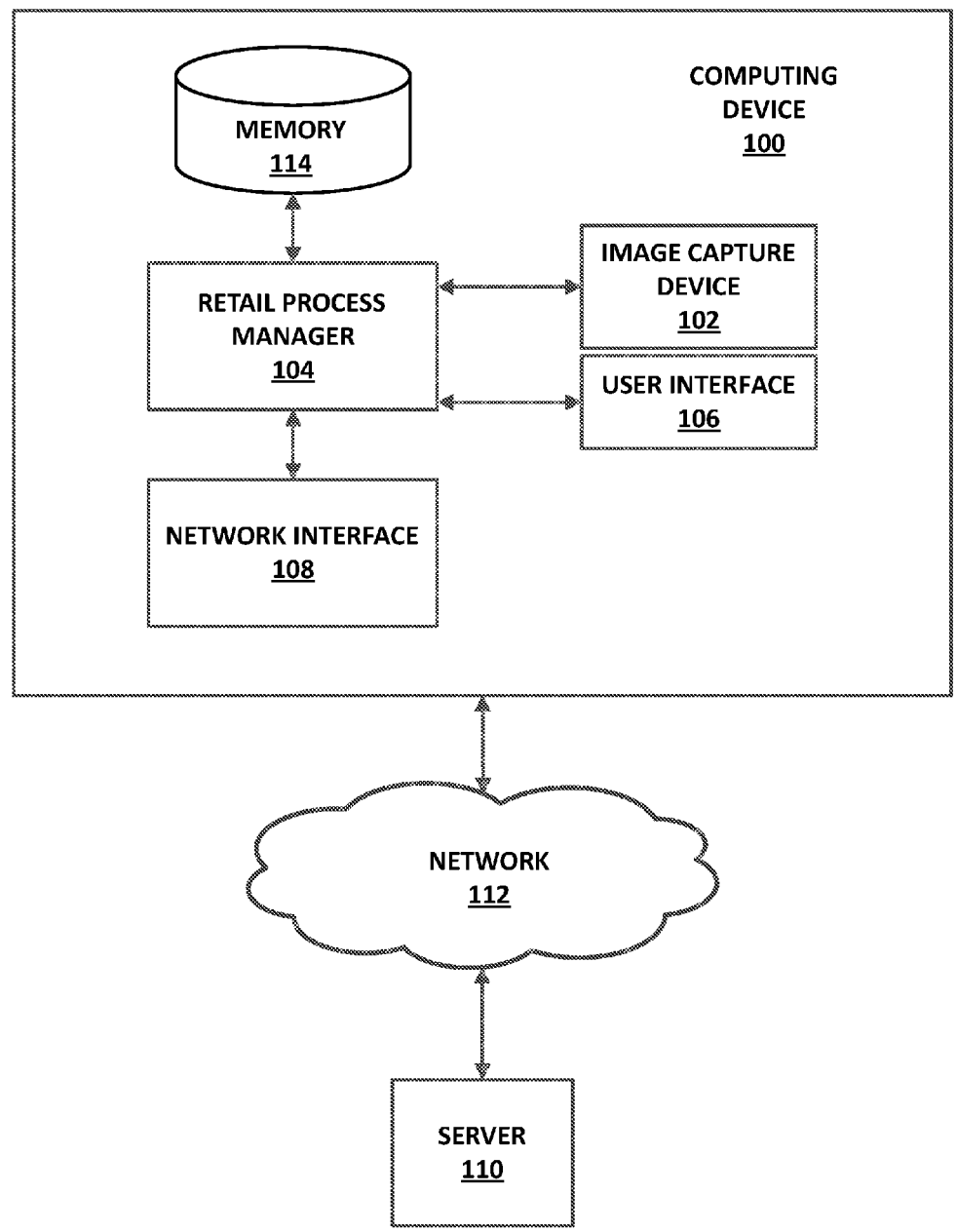
FIG. 1 is a block diagram of an example system for implementing retail processes based on machine-readable-images and user gestures in accordance with embodiments of the present invention.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present invention. A computing device may be, for example, retail equipment such as POS equipment. In another example, a computing device may be a server or other computer located within a retail environment and communicatively connected to other computing devices (e.g., POS equipment or computers) for managing accounting, purchase transactions, and other processes within the retail environment. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD). A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on smart phone, the examples may similarly be implemented on any suitable computing device, such as a computer.

As referred to herein, the term "user interface" is generally a system by which users interact with a computing device. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

The presently disclosed invention is now described in more detail. For example, FIG. 1 illustrates a block diagram of an example system for implementing retail processes based on machine-readable-images and user gestures in accordance with embodiments of the present invention. Referring to FIG. 1, the system includes a computing device 100 including an image capture device 102 and a retail process manager 104. The computing device 100 may be a wearable computing device such as, but not limited to, a computing device including a mechanism configured to enable wear of the computing device. In an example, the computing device 100 may be a tablet computer. In another example, the computing device 100 may be an optical head-mounted display device (e.g., the wearable computer referred to as Google Glass available from Google of Menlo Park, Calif.). The computing device 100 may include a user interface 106, such as a display (e.g., touchscreen display), a touchpad, and/or the like. The image capture device 102 may be configured to capture one or more images and/or video.

The computing device 100 may include a network interface 108 configured to communicate with another computing device via a BLUETOOTH® communications connection or another suitable communications connection. The network interface 108 may communicate with another computing device, such as a server 110, via a network 112 (e.g., a local area network or a wide area network).

The computing device 100 may be configured to use a display of the user interface 106 to implement augmented reality functions. For example, the image capture device 102 may capture and display images on the display. Further, the computing device 100 may simultaneously control the display, along with the captured images displayed in real time, augmented elements of the captured images. For example, the display images may also include information relating to objects or areas in the captured images.

The retail process manager 104 may be implemented by hardware, software, firmware, or combinations thereof. For example, the retail process manager 104 may include one or more processors and memory 114 including instructions for implementation by the processor(s). The retail process manager 104 may be connected to the image capture device 102, the user interface 106, and the network interface 108 for implementation of the functionality disclosed herein.

Figure 2:
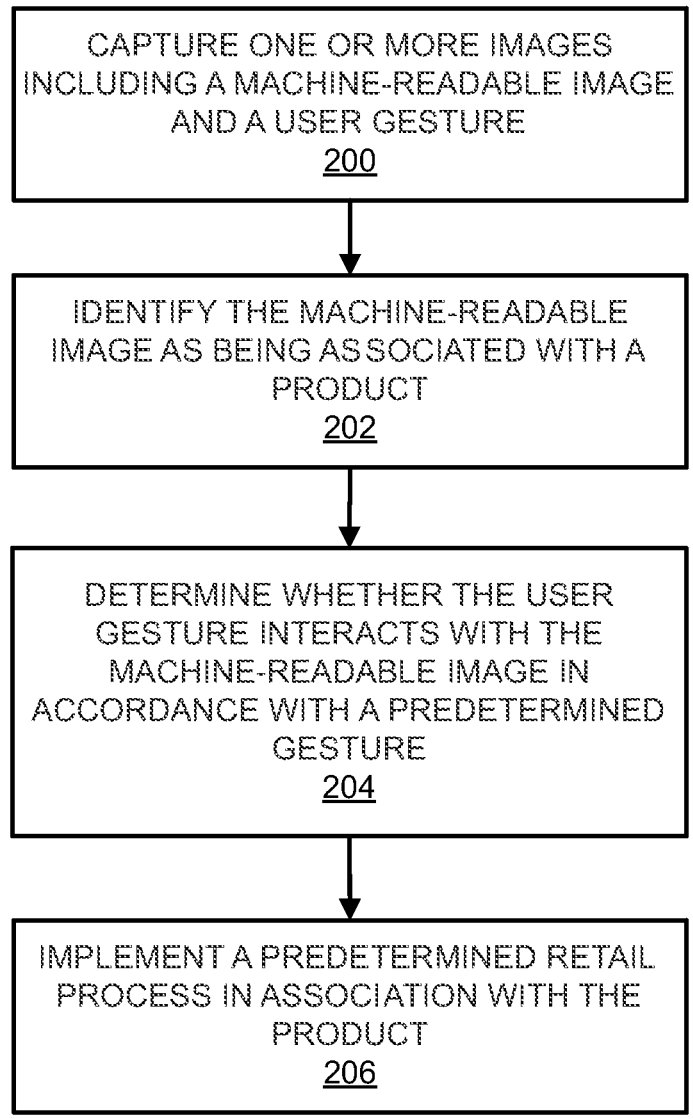
FIG. 2 is a flow chart of an example method for implementing retail processes based on machine-readable images and user gestures in accordance with embodiments of the present invention.

FIG. 2 illustrates a flow chart of an example method for implementing retail processes based on machine-readable images and user gestures in accordance with embodiments of the present invention. The method of FIG. 2 is described by example as being implemented by the retail process manager 104 of the computing device 100 shown in FIG. 1, although it should be understood that the method may be implemented by any suitable computing device(s). Further, reference is made to the example image shown in FIG. 3 and described in further detail herein, although it should be understood that any one or more other images may be used in accordance with embodiments of the present invention.

Referring to FIG. 2, the method includes capturing 200 one or more images including a machine-readable image and a user gesture. For example, the retail process manager 104 may control the image capture device 102 to capture one or more images. In an example, the image capture device 102 may capture a still image or video of a barcode. Example barcodes include, but are not limited to, two-dimensional barcodes and matrix barcodes. The video may be captured in real time. Further, the captured image or video data may be stored in the memory 114.

The retail process manager 104 may control a display (e.g., the display on a tablet computer or an optical head-mounted display device) of the user interface 106 to display the captured image or video. The image or video may be displayed in real time. For example, the user may be store associate using the computing device to implement retail operations in a retail store. In an example, the store associate may be conducting inventory in the store.

Figure 3:
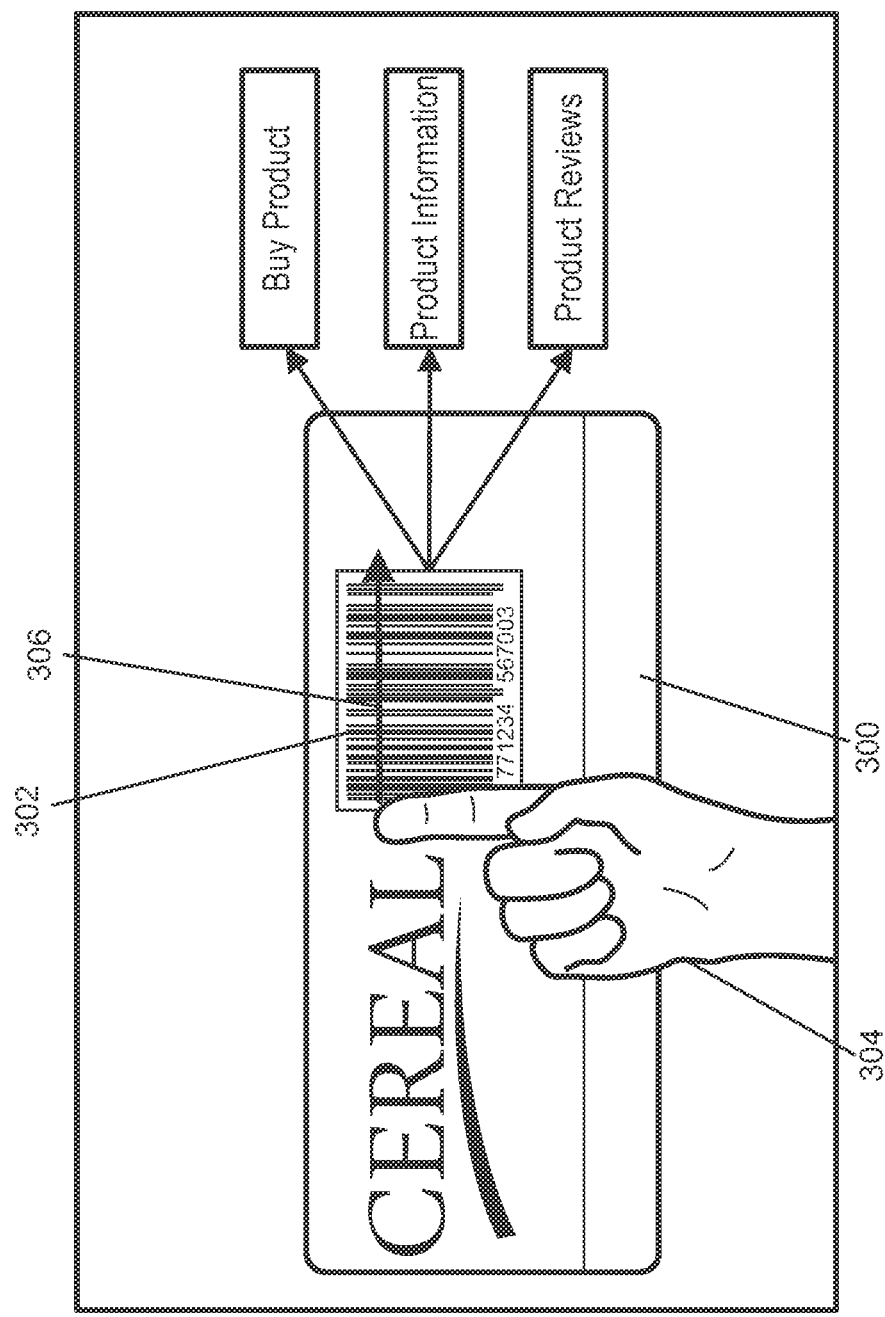
FIG. 3 is a screen display of an example image captured by a computing device in accordance with embodiments of the present invention.

FIG. 3 illustrates a screen display of an example image captured by a computing device in accordance with embodiments of the present invention. The image one frame of a video captured of a side of a product 300 having a barcode 302 printed on a side thereof. Further, the captured video may include a hand 304 of a user of the computing device 100 moving in a direction indicated by the direction arrow 306.

Referring again to FIG. 2, the method includes identifying 202 the machine-readable image as being associated with a product. Continuing the aforementioned example, the retail process manager 104 may be configured to receive one or more captured images of the barcode 302 shown in FIG. 3. The retail process manager 104 may be configured to interpret the numerical digits (or other data) that the barcode 302 represents and associate the numerical digits with an identifier for the product 300. Based on the product identifier, the retail process manager 104 may be configured to request from the server 110 or otherwise obtain information about the product 300 based on the identifier.

The method of FIG. 2 includes determining 204 whether the user gesture interacts with the machine-readable image in accordance with a predetermined gesture. Continuing the aforementioned example, the retail process manager 104 may recognize that the hand 304 is the hand of a user of the computing device 100. Further, the retail process manager 104 may recognize that the hand 304 is making a point gesture and moving in a swiping motion across the recognized barcode 302 in the direction 306. The user gesture may be deemed by the retail process manager 104 to be in accordance with a predetermined gesture for interacting with the barcode 302. Although a swiping gesture and a point gesture is described as being recognized in this example, it should be appreciated that any other suitable gesture captured in one or more images may be recognized as being indicative of an interaction with a machine-readable image in accordance with the present invention.

The method of FIG. 2 includes implementing 206 a predetermined retail process in association with the product in response to determining that the user gesture interacts with the machine-readable image in accordance with the predetermined gesture. Continuing the aforementioned example, the retail process manager 104 may add the product to an inventory list, a purchase list, or any other list in response to determining that the hand 304 is making a point gesture and moving in a swiping motion across the recognized barcode 302 in the direction 306. This functionality may be used, for example, for inventorying items within a retail store. For example, the product may be added to the inventory list after recognition of the user gesture interacting with the barcode 302.

In another example, the retail process manager 104 may conduct a purchase transaction for purchase of the product 300 in response to determining that the hand 304 is making a point gesture and moving in a swiping motion across the recognized barcode 302 in the direction 306. This functionality may be used, for example, for user by a customer in purchasing the product by adding the product to a cart for subsequent checkout and purchase.

In accordance with embodiments of the present invention, the retail process manager 104 may control the display to display an augmented reality interface together with the display of one or more images. Referring again to FIG. 3, the augmented reality interface may include the boxes in the figure containing the phrases "Buy Product," "Product Information," and "Product Reviews". The user may interact with the boxes to initiate a command. For example, the "Buy Product" box may be interacted with to initiate purchase of the product or add to product to a cart for subsequent purchase. The "Product Information" box may be interacted with to request additional information about the product, and the information may be displayed via the augmented reality interface. The "Product Reviews" box may be interacted with to request review information about the product, and the review information may be displayed via the augmented reality interface.

In accordance with embodiments of the present invention, the retail process manager 104 may determine a position of the user gesture in the image(s) and controlling the display to display an identifier for identifying the position of the user gesture. For example, the tip of the finger of the hand 304 shown in FIG. 3 may be augmented via a suitable augmented reality technique to include an indicia to show the location of the fingertip. In an example, the fingertip may be augmented with a colored dot such that the user may see on the display that the computing device 100 recognizes the finger and/or hand 304.

In an example scenario, a customer may be in a retail store and may carry the computing device 100. Further, the customer may pick up an item, such as the product 300 shown in FIG. 3. Further, the customer may orient the product 300 such that the barcode 302 faces the image capture device 102. Further, the customer can point his or her finger at the one end of the barcode, and the retail process manager 104 can recognize the barcode 302 and augment the words "barcode located, swipe to buy". The customer can subsequently swipe his or her finger from one end of the barcode 302 to the other. In response to the swipe gesture, the retail process manager 104 scans the barcode 302 and adds the product 300 to the customer's shopping cart. The customer may subsequently place the product 300 in the cart and moves on to the next. When he or she is done with shopping, the customer can walk out the door. The computing device 100 may recognize that the customer left the store, and in response thereto, the computing device 100 may total the transaction and charge his or her financial account.

In another example scenario, an employee in a retail store and carrying the computing device 100 can use a "point and swipe" gesture to take inventory of items being placed on store shelves.

In accordance with embodiments of the present invention, the user interface 106 of the computing device 100 shown in FIG. 1 may include a video display. The retail process manager 104 may apply augmented reality (AR) to an existing video feed from the image capture device 102. The retail process manager 104 may use image recognition to find the barcode for a product, such as the product 300 shown in FIG. 3. In the video display, a blue box is placed around the barcode 302 and arrows point to buttons that provide additional options. In this example, the customer can buy the product, obtain additional product information or obtain reviews about this product. The customer may touch the buttons. When the camera picks up, the customer's hand (or finger) and the retail process manager 104 recognizes the button being touched, the button action may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
  capturing one or more images including a machine-readable image and a user gesture;
  identifying the machine-readable image as being associated with a product;
  integrating an augmented reality interface with the identified machine-readable image and the user gesture;
  determining a position of the user gesture in the one or more images;

identifying the position of the user gesture in the one or more images as it interacts with the machine-readable image within the augmented reality interface;

determining whether the user gesture interacts with the machine-readable image in accordance with a predetermined gesture; and in response to determining that the user gesture interacts with the machine-readable image in accordance with the predetermined gesture, implementing a predetermined retail process in association with the product.

2. The method of claim 1, wherein capturing the one or more images comprises using an image capture device to capture the one or more images.

3. The method of claim 2, wherein the image capture device is part of a computing device.

4. The method of claim 3, wherein the computing device is a wearable computing device.

5. The method of claim 3, wherein the computing device is an optical head-mounted display device.

6. The method of claim 1, wherein the machine-readable image is a barcode.

7. The method of claim 6, wherein the barcode is one of a two-dimensional barcode and a matrix barcode.

8. The method of claim 1, wherein the machine-readable image represents data that identifies the product, and wherein identifying the machine-readable image comprises interpreting the data to identify the product.

9. The method of claim 1, wherein determining whether the user gesture interacts with the machine-readable image in accordance with a predetermined gesture comprises determining one of a swipe gesture with respect to the machine-readable image and a point gesture with respect to the machine-readable image.

10. The method of claim 1, wherein implementing the predetermined retail process comprises adding the product to an inventory list.

11. The method of claim 1, wherein implementing the predetermined retail process comprises adding the product to a purchase list.

12. The method of claim 11, further comprising conducting a purchase transaction for purchase of the product.

13. The method of claim 1, further comprising displaying the one or more images.

14. The method of claim 1, further comprising displaying an augmented reality interface together with the display of the one or more images.

15. The method of claim 14, further comprising determining a position of the user gesture in the one or more images, and wherein displaying the augmented reality interface comprises displaying an identifier for identifying the position of the user gesture.

16. The method of claim 1, wherein the capturing, identifying, determining, and implementing steps are implemented by a computing device.

17. The method of claim 16, wherein the computing device is a wearable computing device.

18. The method of claim 16, wherein the computing device is an optical head-mounted display device.

19. A computer program product comprising a computer readable storage medium having program instructions embodied therewith, the program instructions readable by a computing device to cause the computing device to:

receive, by the computing device, one or more captured images including a machine-readable image and a user gesture;

identify, by the computing device, the machine-readable image as being associated with a product;

integrate an augmented reality interface with the identified machine-readable image and the user gesture;

determine a position of the user gesture in the one or more images;

identify the position of the user gesture in the one or more images as it interacts with the machine-readable image within the augmented reality interface;

determine whether the user gesture interacts with the machine-readable image in accordance with a predetermined gesture; and implement, by the computing device, a predetermined retail process in association with the product in response to determining that the user gesture interacts with the machine-readable image in accordance with the predetermined gesture.

* * * * *